July 16, 1963 E. J. KUREK 3,097,587
AIR FLOW CONTROL MEANS FOR AIR SCREEN STRUCTURES
Original Filed Jan. 26, 1959 5 Sheets-Sheet 1

INVENTOR.
EDWIN J. KUREK
BY
Cromwell, Greist and Warden
ATTORNEYS.

July 16, 1963 E. J. KUREK 3,097,587
AIR FLOW CONTROL MEANS FOR AIR SCREEN STRUCTURES
Original Filed Jan. 26, 1959 5 Sheets-Sheet 3

INVENTOR.
EDWIN J. KUREK
BY
Cromwell, Greist and Warden
ATTORNEYS.

July 16, 1963 E. J. KUREK 3,097,587
AIR FLOW CONTROL MEANS FOR AIR SCREEN STRUCTURES
Original Filed Jan. 26, 1959 5 Sheets-Sheet 4

INVENTOR.
EDWIN J. KUREK
BY
Cromwell, Greist and Warden
ATTORNEYS.

July 16, 1963     E. J. KUREK     3,097,587
AIR FLOW CONTROL MEANS FOR AIR SCREEN STRUCTURES
Original Filed Jan. 26, 1959     5 Sheets-Sheet 5
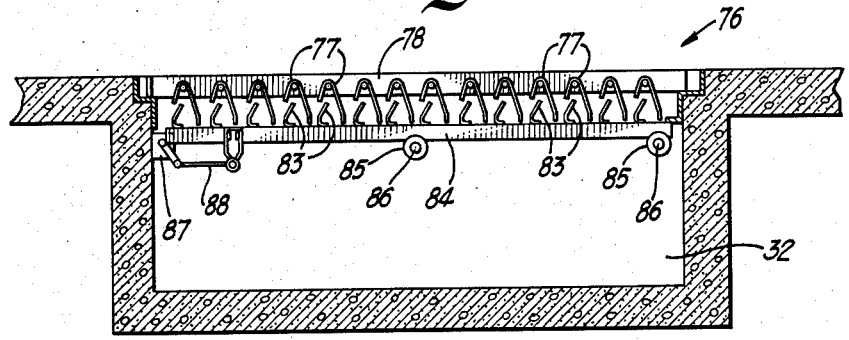
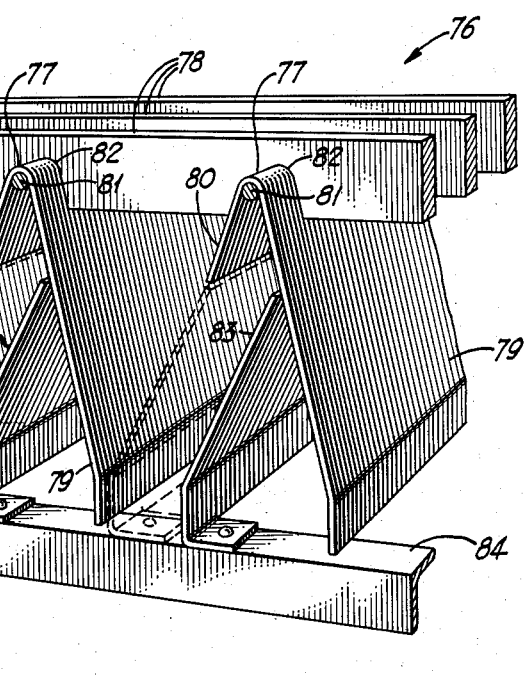
INVENTOR.
EDWIN J. KUREK
BY
Cromwell, Greist and Warden,
ATTORNEYS.

# United States Patent Office 3,097,587
Patented July 16, 1963

3,097,587
AIR FLOW CONTROL MEANS FOR AIR SCREEN STRUCTURES
Edwin J. Kurek, Indianapolis, Ind., assignor to New Castle Products, Inc., New Castle, Ind., a corporation of Indiana
Continuation of application Ser. No. 788,949, Jan. 26, 1959. This application Apr. 23, 1962, Ser. No. 189,539
5 Claims. (Cl. 98—36)

The present invention deals with the utilization of a moving screen of air in a doorway area as a substitute for the standard swinging or revolving types of doors, the invention being specifically directed to air flow control means in the form of a grating for new and improved use as an air inlet means in a recirculating air screen structure.

Commercial use of air closures of the type providing for a continuously moving screen of air capable of efficiently closing off a passage-type entrance has recently become feasible as a result of the availability of adequate air flow control equipment. Air screen structures of the type now found in use provide means whereby air is continuously recirculated at a sufficient velocity and in a regulated manner to provide for a substantially impregnable air screen capable of closing off a building opening in the form of a door structure to an extent that movement of inside or outside air or foreign material through the screen is prevented while allowing full and uninterrupted use of the door structure for ingress or egress by customers or inhabitants. A continuously moving screen of air creates, in effect, an invisible wall which is capable of preventing penetration of outside air, foreign materials such as dust, dirt, or debris, insects and even snow, rain, or mud. In my Patent No. 2,955,521 I disclose a complete air screen assembly which is provided with an adjustable ceiling grating by means of which the direction of flow of the air stream entering the door area and defining the air screen is controlled. The air directional control elements of the ceiling grating, as disclosed in my patent, are automatically regulated in response to variations in inside and outside air pressure conditions to adjust the direction of air stream flow in a compensating manner to maintain efficient functioning of the air screen. A static pressure differential control system forms a part of the structure and functions to measure differential pressure on each side of the air screen to responsively operate the ceiling grating control elements to vary the direction of flow of air forming the air screen and thus compensate for variable external and internal pressures.

In connection with my continuing study of air screen definition and control, I have discovered an improved type of air intake and return floor grating which provides for efficient air recirculation throughout the air screen system even where space limitations are such that air loss could constitute a substantial problem. As disclosed in my patent, it is desirable to maintain a recirculating system involving the control of air discharge across the passageway or opening to form an effective screen, the capturing of at least a substantial quantity of the heated or cooled air in an air return chamber located below the floor of the passageway, the filtering of the captured air during recirculation thereof to the overhead air discharge means, and the reconditioning of the recirculated air by heating or cooling to the extent desired. The air intake and return floor grating of the present invention is particularly useful in a recirculating system of the type described although it can be used in other types of systems. The basic form of my floor grating provides air bounce repression means preventing reverse directional flow of air upwardly against the downwardly flowing air screen as a result of air being introduced into the air return chamber impinging on the floor of the chamber and being redirected countercurrently to establish air flow. Another form of the invention involves an adjustable air intake and return floor grating which in addition to air bounce repression provides for the automatic control of the total air mass introduced into the air return chamber and ultimately recirculated through the system. By controlling the total mass of air returned through the system it is possible to realize a savings in power requirements for air moving purposes during periods of minimum air mass requirements, such as periods when substantially equal internal and external pressure conditions exist relative to the air screen structure.

The foregoing basically sets forth the objects of the present invention and it will be understood that a general object of the invention is to provide new and improved air flow control grating means for use in an air screen structure, such grating means preferably being located for air return purposes in a recirculating air screen structure. Still a further general object is to provide new and improved air screen structure floor grating means capable of air bounce repression and, where desired, provided with adjustable means capable of providing for air mass flow control.

Other objects not specifically set forth will become apparent from the following detailed description of the invention made in conjunction with the accompanying drawings wherein:

FIG. 6 is a fragmentary vertical section of another form of floor grating mounted in operative association in an air return chamber forming a part of the air screen structure; and FIG. 7 is an enlarged fragmentary perspective of the floor grating illustrated in FIG. 6.

Figure 2:
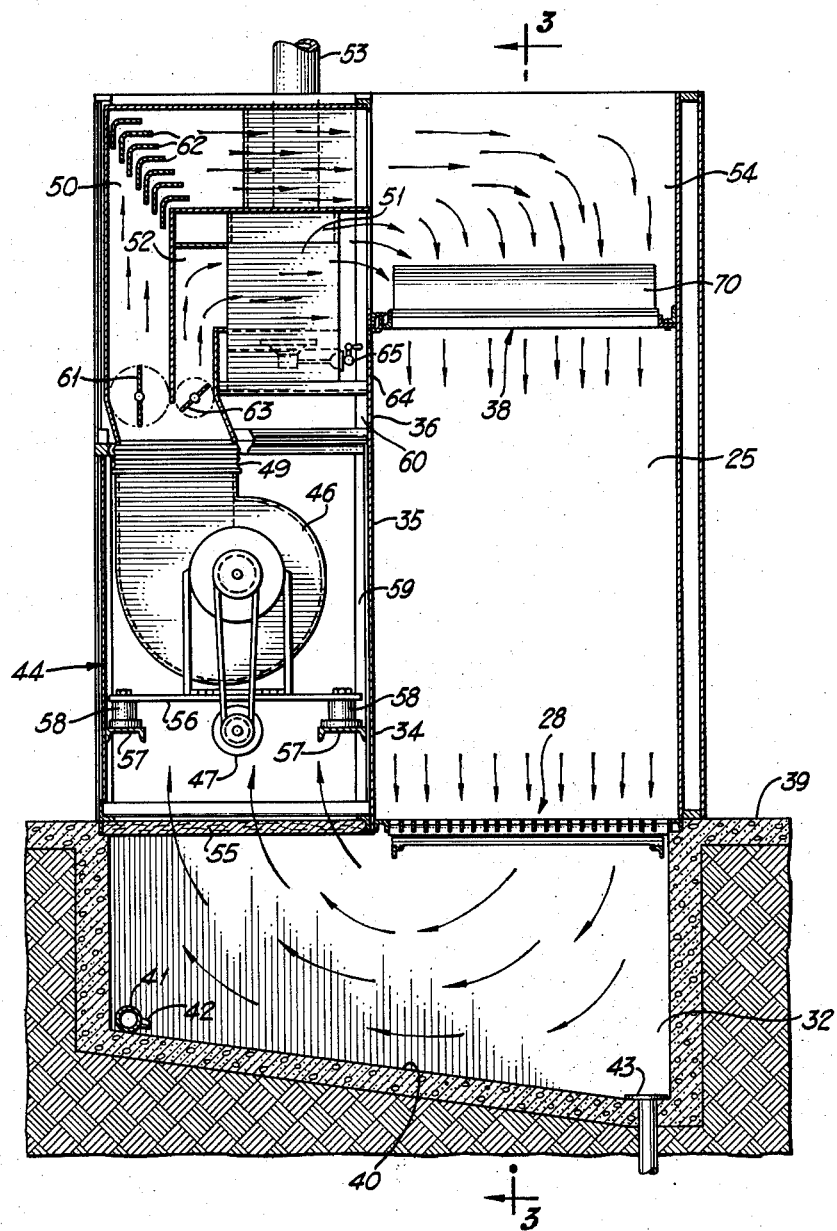
FIG. 2 is a vertical section in end elevation of the air screen structure of FIG. 1 illustrating generally the elements constituting the structure and utilized in establishing and maintaining a continuous flow of conditioned air therethrough to define the air screen.
Figure 3:
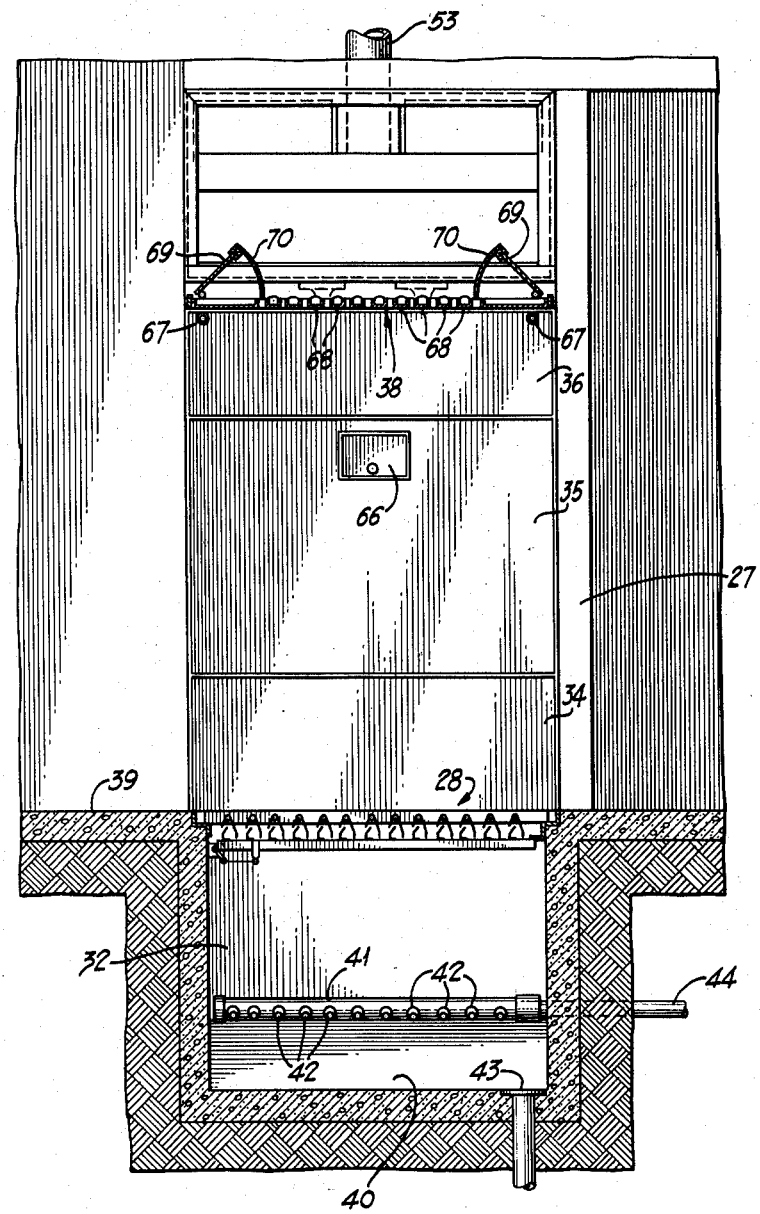
FIG. 3 is a fragmentary section of a portion of the air screen structure of FIGS. 1 and 2 taken generally along line 3—3 in FIG. 2.

This application is a continuation of my co-pending application Serial No. 788,949, filed January 26, 1959, which in turn is a continuation-in-part of my earlier application Serial No. 716,767, filed February 21, 1958, now abandoned. The general arrangement and operational features of the air screen structure illustrated in FIGS. 1–3 are based on my aforementioned Patent 2,955,521 and are disclosed therein.

Figure 1:
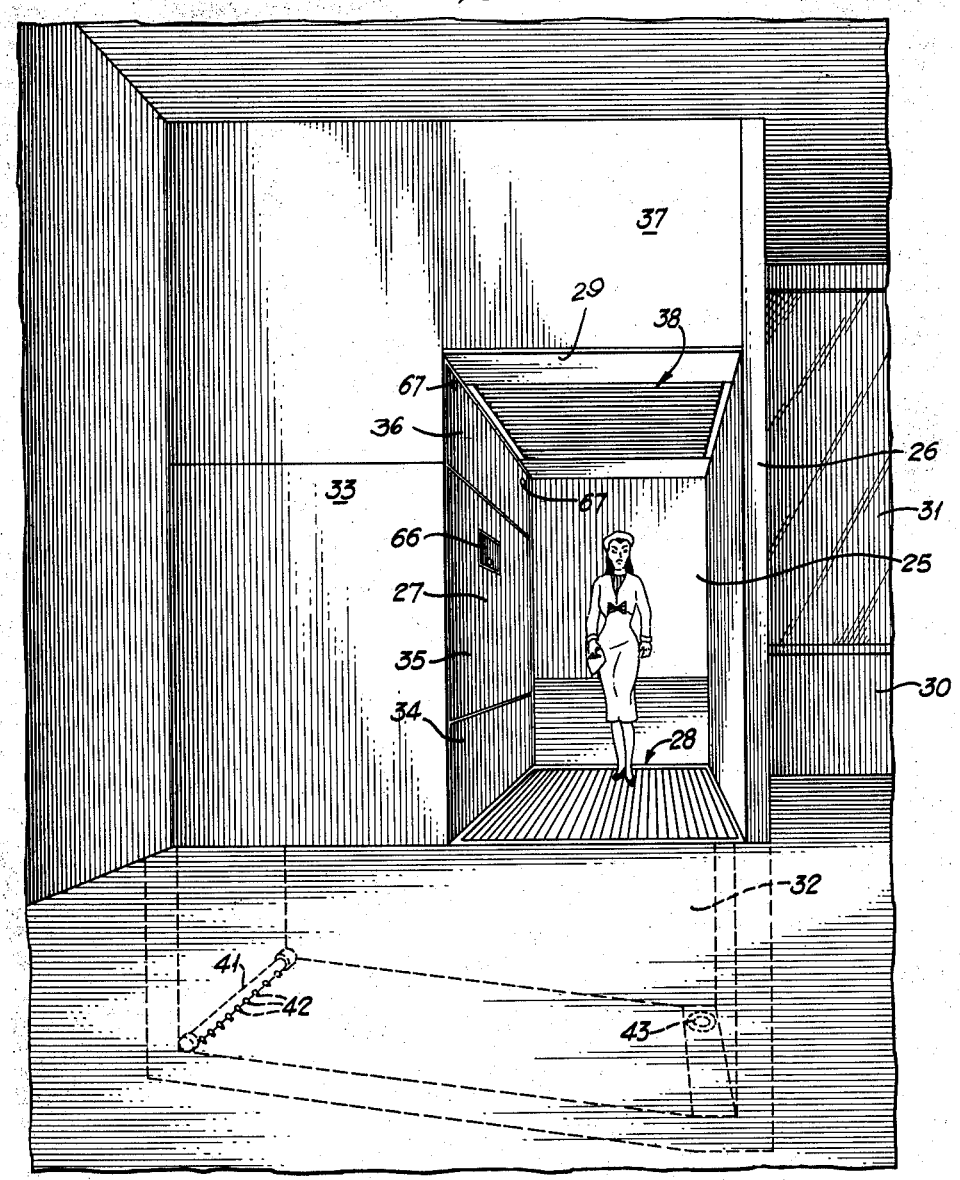
FIG. 1 is a fragmentary perspective of an air screen structure of the type particularly adapted for improved operation by incorporation of the air flow control grating means of the present invention therein.

In FIG. 1 an air screen structure including a unitized air moving and controlling assembly of the type disclosed in my aforementioned patent is illustrated as being defined by an elongated rectangular doorway opening 25 formed from parallel side walls 26 and 27, a grate defining floor 28 and a ceiling 29. The side wall 26 is coextensive with the opposite side wall 27 and is constructed as an inwardly extending wall portion formed from the outer wall 30 of a store front which may include window sections 31. The grating 28 defines a portion of the top of a rectangular pit 32 which is of a width equal to the grating 28 while being in length equal to the width of the entire door structure. The pit 32 defines an air return chamber from which air is drawn into a prefabricated, unitized air moving and conditioning assembly mounted behind the side wall 27 and enclosed at the inner end, as in FIG. 1 by a wall partition 33.

The moving and conditioning assembly is vertically arranged behind the side wall 27 and wall partition 33 and access panels 34, 35 and 36 are removably mounted in the central portion of the side wall 27 for dismounting for access to the air moving and conditioning assembly in connection with maintenance thereof. The ceiling 29 defines the bottom wall of an enclosed plenum area, the location of which is defined by the uppermost wall section 37. Air is introduced by the air moving and conditioning assembly housed behind the wall partition 33 into the plenum area behind the wall section 37 and downwardly through the ceiling 29 in a controlled manner by means of an air distributing and discharge control assembly 38 housed by the ceiling 29. Air is moved at a relatively high velocity downwardly between the side walls 26 and 27 in a controlled manner to define a transversely extending air screen, the air moving through the grating 28 and into the pit 32 for recirculation within the door structure.

As particularly shown in FIG. 2, the pit 32 is located below the floor line 39 with which the grating 28 is level and may be in the form of a poured concrete basin or chamber being provided with an inclined bottom wall 40. Near the upper end of the bottom wall 40 is positioned a spray pipe 41 provided with a plurality of water directing nozzles 42 arranged to sweep the bottom wall 40 in a direction toward a drain 43 extending through the bottom wall 40 at the lowest end thereof. A suitable water supply pipe is connected with the spray pipe 41 to provide water thereto for flushing the pit 32 and removing therefrom debris, dirt and other foreign matter which falls through the grating 28 and is collected on the bottom wall 40. Preferably, an automatic timer is electrically connected to an automatic valve structure to provide for periodic operation of the spray assembly at predetermined time intervals. With this arrangement the interior of the pit 32 is periodically cleaned in an automatic manner as determined by the extent to which the air screen structure is used.

As particularly shown in FIG. 2, the air moving and conditioning assembly housed in the side wall 27 and positioned to one side of the door structure opening 25 includes a pair of prefabricated or preassembled, separate units 44 and 45 which function to provide for continuous air movement in a substantially circular manner through the door structure as indicated by the arrows. Generally speaking, the lowermost unit 44 functions as an air moving unit by reason of including an air blower 46 of known design being belt-driven by an underslung motor 47. The outlet opening of the blower 46 is connected with a duct 48 by a flexible and longitudinally expandable diaphragm-like connection 49, the duct 48 forming a part of the air delivery and conditioning unit 45. This latter unit includes an outer duct 50 which is, in essense, wrapped around an air heating unit 51 having in communication therewith a separate duct means 52 for delivering air thereinto. The heater 51 is provided with a venting stack 53 and air is delivered through the duct 50 and heater 51 into the plenum area 54. The bottom surface of the plenum 54, as previously described, is defined by the ceiling 29 which carries the air distribution and discharge control assembly 38 through which the air is controllably discharged in a downwardly direction across the door structure opening 25 and subsequently through the grating 28 into the pit 32 for recirculation.

The units 44 and 45 of FIG. 2, as previously described, are prefabricated units each of which is separately assembled at the factory and shipped to the job site. At the job site the shipping packing of each unit is removed and the unit 44 is installed in the preconstructed side wall cavity of the door structure with the unit 45 being subsequently installed on top of the unit 44 in stacked relation and the blower 46 being interconnected with the duct 48 by means of the flexible diaphragm 49. With this arrangement, installation costs are maintained at a minimum and each of the units 44 and 45 is of compact design so as to require only a relatively small area for mounting in their operative positions. No special structural or framework supporting means need be installed at the job site, it being necessary merely to preconstruct the wall cavity into which the air moving and conditioning assembly is to be installed in accordance with the dimensions of the same which are readily obtainable from the manufacturer.

Other structural details of the air screen structure as shown in FIG. 2 and as fully disclosed in my aforementioned patent include a filter screen 55 through which air moves from the pit 32 into the air moving unit 44. The blower 46 and underslung motor 47 are suitably mounted on a transverse frame structure 56 which is supported by spaced beams 57 through resilient mounting members 58. The beams 57 form a part of a permanent structural frame 59 which houses the blower 46 to establish a prefabricated unit of the type previously described. The air conditioning unit 45 is similarly of unitized construction including a box-like frame 60 suitably supporting therein the ducts 50 and 52 and the heater 51. An adjustable baffle or damper 61 controls the amount of circulating air by-passing the heater 51 through the duct 50, the upper portion of the duct 50 being provided with a plurality of fixed baffles 62 changing the direction of air flow for discharge into the plenum 54. The duct 52 similarly is provided with an adjustable baffle or damper 63 to control the amount of air passed through the heater 51. The heater 51 may be of any suitable construction such as including a gas burner 64 controlled by suitable gas delivery valve means 65 which are located directly behind the access panel 36 for regulation. Combustion gases are vented through the stack 53 from the air screen structure and out of the building in which it is installed. Heated air mixes with by-passed air in the plenum 54 to provide a downwardly moving current of warm air for air screen defining purposes and for comfortable contact with persons passing through the door area 25.

FIG. 3 illustrates some of the structural features already described in connection with FIGS. 1 and 2. The access panel 35 is provided with a removable control panel 66 for ready access to various controls for motor and blower operation, etc. The panel 36 provides access to the valve means 65 of the heater 64 and carries a pair of spaced openings 67 in which are received air pressure sensing means which form a part of a control system of known type. Any suitable pressure sensing system may be used in the air screen structure and the operation of such a system will be described below. Generally speaking, a system now used in commercial application includes flexible tubing in communication with the internal and external conditions on either side of the door structure to transmit internal and external pressure to a suitable sensing mechanism which brings about energization of a power source, such as a motor, in response to pressure differential to operate the air discharge control means 38 of the structure in a manner to be described. While the points of communication of the pressure differential sensing system are illustrated in FIG. 3 as forming a part of the door structure itself, it will be understood that internal and external pressure measurements may be taken at any desirable locations relative to the door structure.

The air distributing and discharge control assembly 38 of the type shown in FIGS. 2 and 3 is disclosed in detail in my aforementioned patent and will be generally described herein merely in connection with completing the basic description of the main operational components of the air screen structure. Obviously, other suitable assemblies may be used. The assembly 38 is of generally rectangular configuration including a plurality of spaced, bar-like members 68 which are directed transversely across the entrance way or passage and which form a grate through which air passes in a downward direction from the plenum 54 downwardly through the floor grating 28 and into the pit 32 as indicated by the arrows in FIG. 2. Opposite ends of the frame of the assembly 38 carry pivotally mounted rods 69 which pivot above the assembly 38 in the plenum 54 and which at their outermost ends have attached thereto transversely continuous arcuate vanes 70 arranged to move with the rods in a vertical direction above and through the assembly 38 utilizing spaces between the bar-like members 68 at opposite ends of the assembly. The vanes are dimensioned to be positioned above the assembly 38 in inoperative relation therewith as illustrated in FIG. 3, and to be positioned to project through the assembly 38 in depending relation therefrom in their operative position (not shown). The rods 69 are suitably attached to an operating mechanism (not shown) which pivots the rods and vanes 70 in response to the establishing of differential pressures internally and externally of the building as sensed by the air pressure sensing means exposed through the openings 67 of the panel 36.

The particular air distributing and discharge control assembly 38 provides means whereby the direction of downwardly moving air current defining the screen can be redirected to compensate for changing external and internal pressure conditions which might cause breaching or partial destruction of the air screen. This particular operational aspect of the air screen structure disclosed is fully covered in my aforementioned patent and does not constitute a part of this invention.

Briefly, the vanes 70 are independently operated depending upon the direction of the greatest pressure through as passage 25. Upon a lowering of one of the vanes 70 to an extent that a substantial portion thereof projects downwardly below the assembly 38 and into the upper portion of the passage 25, the downwardly projecting portion of the vane creates a vacuum pocket rearwardly thereof and air discharged through the assembly 38 will be directed at an angle toward the appropriate end of the passage 25 by reason of the presence of this vacuum pocket. Thus the air being discharged from the plenum 54 is slanted directly toward the source of highest pressure and combats an internal or external pressure as the case may be. The positions of the vanes 70 will be automatically controlled by the pressure differential sensing means forming a part of the structure.

Figure 4:
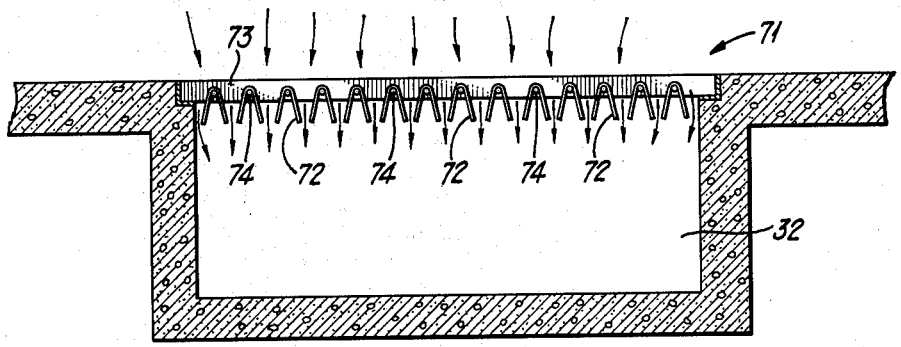
FIG. 4 is a fragmentary vertical section of an air return chamber including the improved floor grating forming a part of the present invention.
Figure 5:
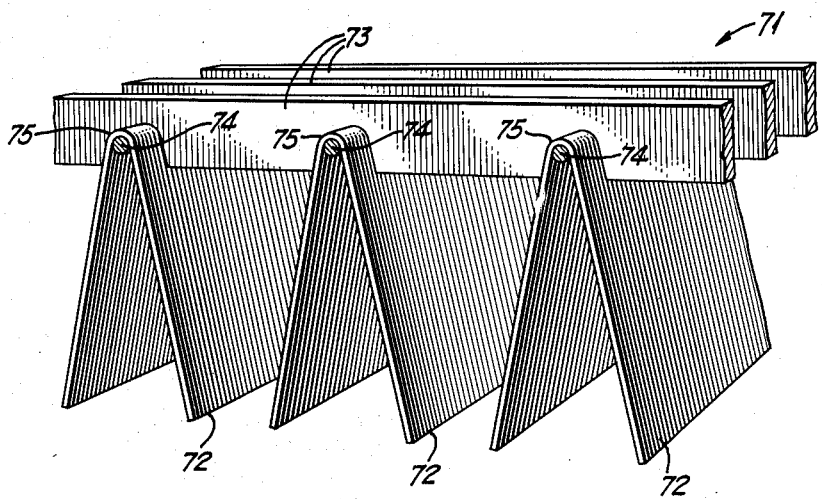
FIG. 5 is an enlarged fragmentary perspective of the floor grating of FIG. 4.

The essence of the invention resides in the new and improved floor grating structures illustrated in detail in FIGS. 4–7. FIGS. 4 and 5 illustrate a basic design concept in the form of a fixed floor grating structure 71 particularly adapted for use in an air screen installation of the type described wherein the air return chamber or pit 32 is, by necessity, less deep than is desired to generally accommodate requisite air flow for recirculation. In certain installations, the building dimensions will be such that insufficient space is provided to accommodate a pit of adequate size. Where shallow pits are by necessity utilized, the downwardly flowing air received through the floor grating impinges on the bottom of the pit 32 directly below the floor grating and bounces at least to a certain extent, vertically upwardly therefrom in a reverse direction to interfere with efficient flow of air into the pit for recirculation. Not only is the operation of the door structure adversely affected by such an occurrence, but there is a substantial loss of treated air which materially affects the efficiency of operation of the unit. Floor drafts are also created which may be readily noticeable by persons adjacent the door structure and which may further create an uncomfortable sensation to persons walking through the door area.

In order to minimize the degree of bounce of the primary air stream entering the pit and to prevent its re-emergence from the pit through the grating to thus create an upblast, the improved floor grating 71 is provided with anti-bounce means in the form of inverted V-shaped baffle members 72 which extend in spaced relation transversely of standard bar grating members 73. The baffle members 72 preferably extend transversely of the door opening 25 with the bar members 73 extending longitudinally thereof. This arrangement provides for efficient flow of air through a shallow pit 32, upwardly through the filter 55 and on into the air moving and conditioning portion of the structure as shown in FIG. 2.

Each of the V-shaped baffle members 72 depends downwardly from rods 74 which extend through the spaced bar grating members 73. Each baffle member 72 is slung over its supporting rod 74 and is provided with a series of longitudinally spaced, transverse grooves or slots 75 (FIG. 5) into which a bar 73 is received. With this arrangement the baffles 72 additionally function to space the bars 73 and stabilize the entire grating structure.

The members 72 are each provided with downwardly divergent side portions which define therebetween a groove-like air trapping area which define further with adjacent side portions of adjacent members 72 a plurality of spaced restricted throats through which air passes in a downwardly direction into the pit 32. The air trapping portions prevent the return of air upwardly through the floor grating following bouncing of the same off the bottom surface of the shallow pit 32. The restricted throats defined by adjacent members 72 provide for an increase in air velocity entering the pit 32 to an extent that air bouncing from the bottom surface of the pit cannot re-enter a throat to flow upwardly through the grating.

Air impinging on the tops of the baffle members 72 meets very little resistance as the top surface of each baffle member 72 is rounded. Air traveling downwardly between the baffle members 72 strikes the sloped sides and continuously advances into a reduced area under which circumstances it attains its maximum velocity in the nozzle throat. The air thus issuing into the pit bounces against the floor of the pit but is not able to rise any higher because of the restrictions imposed by the nozzle throats causing a more or less uniform depression of static pressure in the pit with the result that there are downwardly flowing streams of sufficient velocity to trap the air which has been delivered into the pit. The decrease in static pressure in the pit establishes a more or less uniform suction across the entire face of the grating with the air trapping groove-like portions acting as check valves. The only means for escape of air from the pit is by being drawn into the air moving and conditioning portion of the unit through the filter 55 to continue along the path of recirculation.

A modified form of floor grating 76 is illustrated in FIGS. 6 and 7. This grating includes the important structural features of the grating 71 previously described with the addition thereto of movable control means for regulating the total mass of air drawn into the pit 32 on the suction side of the air moving and conditioning portion of the door structure. The grating 76 includes inverted baffle members 77 which are fixed in spaced relation relative to transverse grating bars 78 of the type previously described. Each member 77 is provided with a long side portion 79 and a short side portion 80 which are integrally joined at the top margins thereof in V-shaped relation to define an upper curved surface portion received over a mounting rod 81 extending transversely through the grating bars 78. The members 77 are slotted at 82 along their upper surfaces to receive therein the bars 78 and space the same along the rods 81 as well as impart rigidity to the overall grating structure. Immediately below the series of fixed members 77 is a series of movable baffles 83 which are mounted in spaced relation on frame members 84 (one of which is shown) defined by L-beams which are supported by grooved rollers 85 journaled on shafts 86 suitably supported by opposite walls of the pit 32.

Each of the baffles 83 is provided with an upwardly inclined portion which upon movement of the frame 84 moves into and out of alignment with a shorter side portion 80 of a member 77. Upon movement of the inclined portions of the baffles 83 into alignment with the shorter side portions 80, the baffles 83 constitute a downward extension of the side portions 80 to complete the structure similar to that illustrated in FIG. 5 in connection with the grating 71.

Operation of the floor grating 76 to control air mass flow for recirculation purposes occurs, at least indirectly, as a result of differential pressure measurements taken on either side of the air screen in the manner previously described. A suitable motor 87 (FIG. 6) functions through its linkages 88 attached to the frame 84 to move the baffles 83 as a series transversely of the members 77 on the rollers 85. FIG. 7 illustrates in solid lines the open position of the grating 76 wherein the movable baffles 83 are out of alignment with the shorter side portions 80 of the members 77. Movement of the frame 84 to the left as viewed in FIG. 7 results in movement of the baffles 83 into operative alignment as illustrated in broken lines. This results in a restricting of the throat portions defined by adjacent side portions 79 and baffle members 83 which tends to decrease the mass of air drawn into the pit 32. By decreasing the mass of air introduced into the pit, a corresponding restriction of the total amount of air circulated by the door structure assembly results. The restriction afforded by the adjustable floor grating 76 functions as a damper on the intake of the fan to provide one source of air delivery control to the plenum. This dampening effect also allows for a decrease in power requirement for the operation of the fan. A simplified form of mass or volume recirculation control is thus afforded whereby power requirements can be maintained at a minimum during operation of the air screen under the least demanding conditions.

The most efficient operation of the door structure occurs when the internal and external pressures are substantially equal, thus providing for directional control of the delivery of the air from the plenum in a vertically downward direction to establish a substantially straight flow path directly to the floor grating for recirculation of the air. The adjustable throat size of the floor grating 76 under the conditions described will preferably be such that the air flow therethrough is equal to that delivered into the door area from the ceiling grating. Under ideal operating conditions, the air picked up in the pit for recirculation will include as much treated air as possible for conservation of the same and increased efficiency in operation of the door structure. The structural design of the members 77 of the floor grating 76 are sufficiently similar to that described in connection with the floor grating 71 to function to prevent re-emergence of air from the floor grating into the door area in the instance where a shallow pit structure is used.

Obviously certain modifications and variations of the invention as hereinbefore set forth may be made without departing from the spirit and scope thereof, and therefore only such limitations should be imposed as are indicated in the appended claims.

I claim:

1. In an air screen structure wherein air moving means establishes a recycling flow of air through air delivery means and air return means both in communication with a door area and positioned on opposite top and bottom surface areas thereof to establish a downward flow of air, the provision of directional air flow control means defining said air delivery means, and air mass flow control means defining said return means, said air mass flow control means being in the form of a grating which includes a series of spaced inverted members having downwardly divergent side portions depending from association with transverse grating members, one of said side portions of each inverted member being of less length in a downwardly direction than the other, and a movable series of spaced baffles each of which are inclined to assume the inclination of a shorter side portion of an inverted member and constitute a downward extension of the same upon movement into association therewith, said baffles cooperating with each of the other of said side portions to define therebetween a groove-like air trapping area and restricted throats to control the mass of air flowing downwardly through said grating.

2. An air bounce repression grating for use in an air screen structure in covering relation to an air return chamber below the floor surface of a door area, said grating including a series of spaced inverted V-shaped members depending from association with transverse grating members, the divergent lowermost ends of each of said V-shaped members being adequately spaced to define a groove-like air trapping area with adjacent ends of adjacent V-shaped members defining restricted throats providing for an increase in velocity in air flowing downwardly through said grating, said V-shaped members being suspended by bars extending through said grating members, the top portions of each of said V-shaped members being provided with spaced slots in which the grating members are received.

3. An air bounce repression and air mass flow control grating for use in an air screen structure in covering relation to an air return chamber below the floor surface of a door area, said grating including a series of spaced inverted members having downwardly divergent side portions depending from association with transverse grating members, one of said side portions of each inverted member being of less length in a downwardly direction than the other, and a movable series of spaced baffles each of which are inclined to assume the inclination of a shorter side portion of an inverted member and constitute a downward extension of the same upon movement into association therewith, said baffles cooperating with each of the other of said side portions to define therebetween a groove-like air trapping area and restricted throats to control the mass of air flowing downwardly through said grating.

4. An air bounce repression and air mass flow control grating for use in an air screen structure in covering relation to an air return chamber below the floor surface of a door area, said grating including a series of spaced inverted members having downwardly divergent side portions depending from association with transverse grating members, one of said side portions of each inverted member being of less length in a downward direction than the other, and a movable series of spaced baffles each of which are inclined to assume the inclination of a shorter side portion of an inverted member and constitute a downward extension of the same upon movement into association therewith, said baffles cooperating with each of the other of said side portions to define therebetween a groove-like air trapping area and restricted throats to control the mass of air flowing downwardly through said grating, and baffle positioning means including a frame on which said baffles are mounted, said frame being supported by rollers for transverse baffle movement into and out of alignment with the shorter sides of said inverted members.

5. The grating of claim 4 wherein the inverted members are suspended by bars extending through the grating members, the top portions of each of said inverted members being provided with spaced slots in which the grating members are received.

References Cited in the file of this patent

UNITED STATES PATENTS 2,224,312    O'Day _____ Dec. 10, 1949